United States Patent [19]
Reynolds

[11] 3,821,965
[45] July 2, 1974

[54] APPARATUS FOR FORMING A HOLE IN A PIPE

[76] Inventor: Dennis J. Reynolds, 203 N. Woods, Sherman, Tex. 75090

[22] Filed: Aug. 6, 1973

[21] Appl. No.: 386,078

[52] U.S. Cl. ............................................. 137/318
[51] Int. Cl. ...................... B23b 41/08, F16e 41/04
[58] Field of Search ............ 137/15, 315, 317, 318; 251/145, 233; 408/56; 285/197

[56] References Cited
UNITED STATES PATENTS

| | | | |
|---|---|---|---|
| 1,007,882 | 11/1911 | Markley | 137/318 |
| 1,039,827 | 10/1912 | Sharp | 137/318 |
| 1,617,231 | 2/1927 | Burcham | 408/56 |
| 3,045,512 | 7/1962 | Risley et al. | 137/318 |

Primary Examiner—William R. Cline
Assistant Examiner—David R. Matthews

[57] ABSTRACT

Apparatus for forming a hole in a pipe having a fluid therein under pressure includes a sleeve temporarily attachable to a valve mounted on the pipe. A rod is coaxially disposed within the sleeve and extends at one end of the sleeve through the opened valve in the direction of the pipe to carry a hole-cutting head. The rod extends through the other end of the sleeve and is adapted to receive a rotational force, of at least 50 rpm. First and second yokes are rotatably interconnected, one yoke engaging the sleeve and the other yoke engaging the rod above the cylinder. A lever attached to one of the yokes facilitates applying a downward pressure to the rod to advance the drill head in the direction of the pipe. Means are also provided for pressure sealing the interior of the cylinder where the rod exits from it and to facilitate rotation of the rod.

8 Claims, 1 Drawing Figure

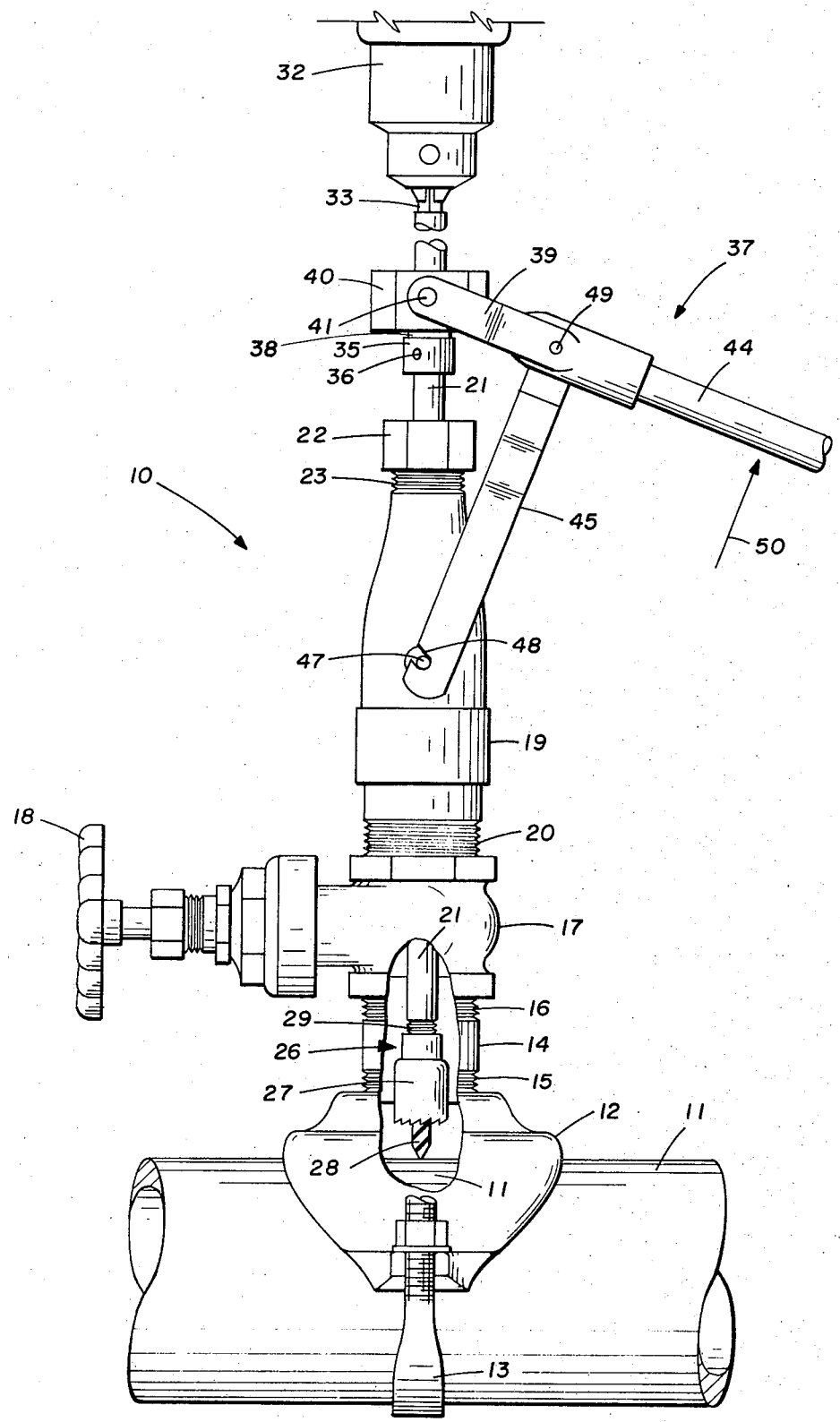

APPARATUS FOR FORMING A HOLE IN A PIPE

BACKGROUND OF THE INVENTION

1. Field of the Invention

This invention relates to hole-drilling apparatuses, and more particularly to improvements in apparatuses for drilling holes in pipes without interrupting the flow of product within the pipe.

2. Description of the Prior Art

Various drilling apparatuses have been used for cutting holes in pipes containing a fluid or a gas under pressure, such as water main, gas main, or the like. It is ordinarily desired that the hole be cut or drilled without interruption of the product flow within the pipe, so means are usually employed to isolate the fluid pressure to within the drilling apparatus during the drilling process.

Such a drilling apparatus is shown in U.S. Pat. No. 2,972,915 in which a cutting head is mounted on a shaft, coaxially carried within a threaded cylinder, in turn, coaxially mounted within an outside sleeve having mating threads on its interior wall to engage the shaft carrying cylinder. The shaft is spring biased within its carrying cylinder in a direction in which the hole is to be formed. The outside sleeve is mounted to a valve attached to the pipe. The shaft carrying cylinder and the shaft are advanced by means of the threaded cylinder engagement until the cutting head contacts the pipe to be cut and the spring bias applied. A ratcheted handle is applied to the shaft outside the cylinder for manually turning the cutting head. Upon penetration of the cutting head into the pipe, the pressure therewithin is contained within the outer sleeve, so no product escapes. After the hole is completed, the cutting head is withdrawn from the pipe and valve, and then closed to seal the product. The apparatus is of complicated construction, much individual machining, for instance, in forming the threads, the biasing arrangement, and the shaft carrying assembly being required. Also, the apparatus has little flexibility in varying the pressure applied to the cutting head. If the spring bias is insufficient or excessive, little or no range exists for correction.

In most apparatuses heretofore advanced, the cutting head is manually operated, such as by a ratcheted hand-operated lever mounted on a rod carrying cutting head. Because of the slow rotation of such ratcheted lever, ordinarily very large pressures must be applied to the cutting head, especially in cutting pipes of steel, cast iron, or asbestos cement. The large pressure applied, in turn, makes the ratcheted lever difficult to operate, resulting in slow, difficult operation of the overall apparatus. A typical such pressure-creating means is shown in U.S. Pat. No. 1,007,882. Because of such large pressures being applied to the cutting head, large ratchet lever operating forces are required, and power motors are not ordinarily feasible for use in operation of such prior art apparatuses. It should be noted that lesser pressures have ben employed in cutting softer or different material than herein contemplated, such as the lever cutting head advanced in U.S. Pat. No. 1,617,231 to cut closet bowl materials. However, to date, with the drill/saw and other cutting heads used in forming holes in pipes of steel, cast iron, asbestos cement, or the like, such levers have not been usable since the ratchet lever requires more force up on the head in the direction of the hole to be cut.

In light of the above, therefore, it is an object of the invention to present an apparatus for cutting or forming a hole in a pipe, primarily of steel, cast iron, or asbestos cement, carrying a fluid or gas under pressure.

It is another object of the invention to present an apparatus for forming a hole in a pipe which is of easier and faster operation than apparatuses heretofore advanced.

It is still another object of the invention to present an apparatus with which a rotational power source can be used.

It is still another object of the invention to provide an apparatus for cutting a hole in a pipe, the advance of the cutting head of which can be manually controlled.

These and other objects, features, and advantages will be apparent to those skilled in the art from the following detailed description when read in conjunction with the accompanying drawing and appended claims.

In its broad aspect the apparatus in accordance with the invention enables a hole to be cut in a pipe carrying fluid under pressure. The pipe has a saddle mounted to it which carries a valve having at least two axially aligned openings, one of which communicating with the interior of said saddle. The apparatus includes a sleeve attachable at one end to the valve at another of the least two axially aligned openings. A drilling shaft is coaxially disposed and freely axially and rotatably moveable within the sleeve and the openings of the valve. A portion of the drilling shaft extends outside the sleeve away from the valve, adapted to be rotated at a speed of at least 50 rpm. Means are provided for forming a pressure seal at the end of the sleeve away from the valve, the pressure seal means receiving the drilling shaft to facilitate rotation thereof, whereby the interior of the saddle, valve, and sleeve are pressure isolated from outside the sleeve. A hole-cutting means is carried by the drilling shaft within the sleeve and a lever means engages the sleeve and the drilling shaft at its portion extending outside the sleeve for controllably advancing said drilling shaft axially to bring the cutting means into cutting engagement with and urged into the pipe.

BRIEF DESCRIPTION OF THE DRAWING

The sole accompanying drawing illustrates a side elevational view, partially cut away, of an apparatus for forming a hole in a pipe, in accordance with the invention.

DESCRIPTION OF THE PREFERRED EMBODIMENTS

In accordance with the invention, as shown in the drawing, the apparatus 10 for forming holes in a pipe 11 is mounted on a valve assembly seated on a saddle 12 fixed to the pipe 11 by a bolt 13. A nipple 14 is attached by threads 15 to the saddle 12 at one end, and at the other end by threads 16 to a valve 17, manually controllable by a valve handle 18. The valve 17, nipple 14, and saddle 12 are of any widely commercially available type and are intended for permanent attachment to the pipe 11. The saddle 12 is, therefore, mounted in a sealed relationship to the outside face of the pipe 11. Thus, after the hole is formed into the pipe with the apparatus of the invention, as below described in detail, and the valve 17 closed by way of the manual handle 18, the fluid or other pressure within the pipe is maintained within the saddle 12, the nipple 14, and the lower portion of the valve 17.

The hole-forming apparatus 10 includes a pressure containing cylinder or sleeve 19 which is temporarily attachable to the valve 17 by threads 20. The sleeve 19 can be of any material which can withstand the pressures and fluids or gases encountered in its intended use, but preferably is of metal, such as lightweight aluminum or the like. Because little machining need be done, for instance, in fabricating the cylinder and the advancing yokes, below described, those parts can conveniently be cast of aluminum or the like. A drilling shaft 21 is coaxially disposed within the cylinder 19, the shaft 21 being of sufficient length to extend in one direction through the threads 20 0f the sleeve 19, the opened valve 17, the nipple 14, and the saddle 12 to engage the pipe 11, and is of sufficient length in the other direction to be operated upon a rotation-producing means and advancing mechanism, as below described. To maintain the fluid or other pressure within the cylinder 19, a sealing nut 22 is provided which engages threads 23 on the sleeve 19. The nut 22 acts as a packing element to prevent the fluid or gas which will be present within the cylinder 19 from escaping at the point where the drilling shaft 21 exits the top of the sleeve 19. The packing nut 22, however, allows the shaft 21 to be freely rotatable. To effect such rotation-free pressure packing, a bronze bushing (not shown) can be provided to seat within the packing nut 22 to receive the drilling shaft 21.

A cutting head 26 is carried on the end of the drilling shaft 21, contained within the sleeve 19 and the valve 17. The cutting head 26 may be, as illustrated, attached to the shaft 21 by means of threads 29 in engagement therewith. The cutting head 26 can be of any cutting configuration, but preferably includes a guide drill 28 centrally disposed within a circular saw 27, such drill-/saw configurations being commercially available, and not described in further detail herein. It should be noted that various sized saws can be employed, and depending upon the size of the circular saw 27, relatively large diameter holes can be cut into the pipe 11, the limiting factor being the size of saw which will freely fit through the valve 17, the nipple 14 and saddle 12.

The shaft 21 is rotated by any convenient rotation supplying means, but because of the particular pressure advance lever, below described, it is particularly suitable for rotation by a powered motor, conveniently, such as by the electric drill 32 illustrated. The electric drill 32 engages a portion 33 of the shaft 21 which has been cut or flattened at its end to receive the chuck of the drill 32. The speed of the drill can be regulated as required, but is preferably at least 50 rpm to adequately drive the drill 28 and circular hole-cutting saw 27 at the speeds required for cutting the particular material of the pipe 11.

To advance the shaft 21 in the direction of the pipe 11, lever advance assembly 37 is provided. The lever assembly 37, in the side view shown, is of general "Y" configuration and includes first and second yokes 39 and 45, respectively, hingedly or rotatably interconnected by a pin 49. A set collar 35 is maintained along the length of the shaft 21 at a predetermined location by a set scew 36. A bronze bushing 38 is provided on the upper surface of the set collar 35 to provide a bearing surface upon which pressure can be applied to advance the shaft 21 without significantly interfering with its rotation. A shaft receiving collar 40 is rotatably attached by a pin 41 to the first yoke 39 to engage on its lower face the bushing 38 of the set collar 35 to exert a downward force upon the collar 35 and shaft 21. The collar 40, however, does not otherwise engage the shaft 21, which is free to rotate therewithin.

The second yoke 45 engages pins 47 on opposite sides of the sleeve 19 within grooves 48 within each divided portion of the yoke. The grooves are cut to enable the second rod 45 to be rotatable upon the pins 47, yet removable for convenience in storing or handling the apparatus between uses. Finally, a lever rod 44 is attached to and extends from the yoke 39 to enable a pressure in the direction of the arrow 50 to be applied to the lever assembly 37, thereby producing a downward force upon the said collar 35 by the collar 40 with respect to the pins 47 to advance the shaft 21 and bring the cutting head 26 into cutting engagement with the pipe 11. The downward force upon the cutting head 26 can be regulated manually by varying the upward pressure applied to the lever 44.

Thus, in operation, the valve 17 attached to the pipe 11 is manually opened and the shaft 21 and cutting head 26 is disposed therethrough, through the nipple 14 and the saddle 12. The cylinder 19 is screwed into the top opening of the valve 17. The set collar 35 is located at the desired location along the length of the shaft 21 and the lever assembly 37 attached. A drill is attached to the shaft 21 at its upper portion 33, and is operated to rotate the shaft and the cutting head 26. The downward cutting advancement of the drill is controlled by the upward pressure upon the lever 44 of the advance lever mechanism 37. Because the pressure of the advance lever assembly 37 can be regulated, the cutting had can be rotated as fast as desired, ordinarily in excess of 50 rpm.

After the hole has been cut in the pipe 11, the shaft 21 and cutting head 26 are withdrawn from the pipe valve 17, and the valve 17 manually closed to isolate the product. The sleeve 19 is then removed from the valve 17, which is then ready to receive whatever further connections as desired.

Although the invention has been described and illustrated with a certain degree of particularity, it is understood that the present disclosure is made by way of example only and that numerous changes in the construction, combination, and arrangement of parts may be resorted to without departing from the spirit and scope of the invention as hereinafter claimed.

What is claimed is:

1. Apparatus for forming a hole in a pipe having a valve mounted to said pipe having at least two axially aligned openings disposed substantially perpendicular to an axis along the length of said pipe, comprising:
   a sleeve temporarily attachable to said valve,
   a drilling shaft coaxially disposed and freely axially and rotatably moveable within said sleeve and the openings of said valve, said drilling shaft having a portion extending outside said sleeve through and away from said valve, adapted to be rotated at a speed of at least 50 rpm,
   means forming a pressure seal at said end of said sleeve away from said valve, said pressure seal means receiving said drilling shaft to permit rotation thereof, whereby the interior of said valve and sleeve are pressure isolated from outside said sleeve, hole-cutting means carried by said drilling shaft within said sleeve, and lever means engaging said sleeve and said drilling shaft at its portion extending outside said sleeve for manually, controllably, and axially advancing said drilling shaft to bring said cutting means into cutting engagement with and urged into said pipe.

2. The apparatus of claim 1 further comprising:

a first collar attachable to said drilling shaft, and pin means outwardly extending from opposite sides of said sleeve, and wherein said lever means comprises:

first and second yokes, rotatably interconnected, said first yoke having pin receiving slots at its forked end to receive said pin means, a second bearing collar, carried between the forked ends of said first yoke, adapted to rotatably receive said drilling shaft, and to bear upon said first collar, and a lever rod attached to said second yoke whereby said first and second yokes transmit the pressure applied to said lever rod to said first bearing collar by said second bearing collar with respect to said sleeve at said pin means to thereby advance said drilling shaft.

3. The apparatus of claim 2 further comprising an electric drill attachable to said drilling shaft to rotate said drilling shaft.

4. The apparatus of claim 3 wherein said hole-cutting means comprises a circular saw and a drill coaxially disposed within said circular saw and extending beyond the saw in its direction of advance.

5. Apparatus for forming a hole in a pipe having a valve mounted to said pipe having at least two axially aligned openings disposed substantially perpendicular to an axis along the length of said pipe, comprising:

a sleeve temporarily attachable to said valve, an elongated rod having ends extending beyond the ends of said sleeve, said rod being coaxially disposed within said sleeve and axially advanceable within said sleeve through said valve in the direction of said pipe, a cutting head, including a circular saw carried by said rod at its end advanceable towards said pipe and a drill carried by said rod within said saw extending beyond said saw in the direction of said pipe, whereby said drill forms a pilot hole in said pipe to guide said saw thereinto, first and second rotatably interconnected yokes, a first collar attachable to said rod at its end above said sleeve, a second collar carried by said first yoke for receiving said rod, adapted to bear upon said first collar, and to permit rotation of said rod, and pins outstanding on said sleeve adapted to be received in slots in said second yoke, whereby upward rotational pressure exerted on said first yoke produces a downward force upon said rod by said first and second collars to advance said cutting head in the direction of said pipe.

6. The apparatus as claimed in claim 5 further comprising a drill attachable to said rod for rotating said rod at a speed of at least 50 rpm.

7. The apparatus of claim 5 further comprising pressure seal enclosing the end of sleeve away from said valve to contain pressure within said cylinder and adapted to permit rotation of said rod.

8. The apparatus of claim 7 wherein said sleeve and said first and second yokes are of aluminum.

* * * * *